UNITED STATES PATENT OFFICE.

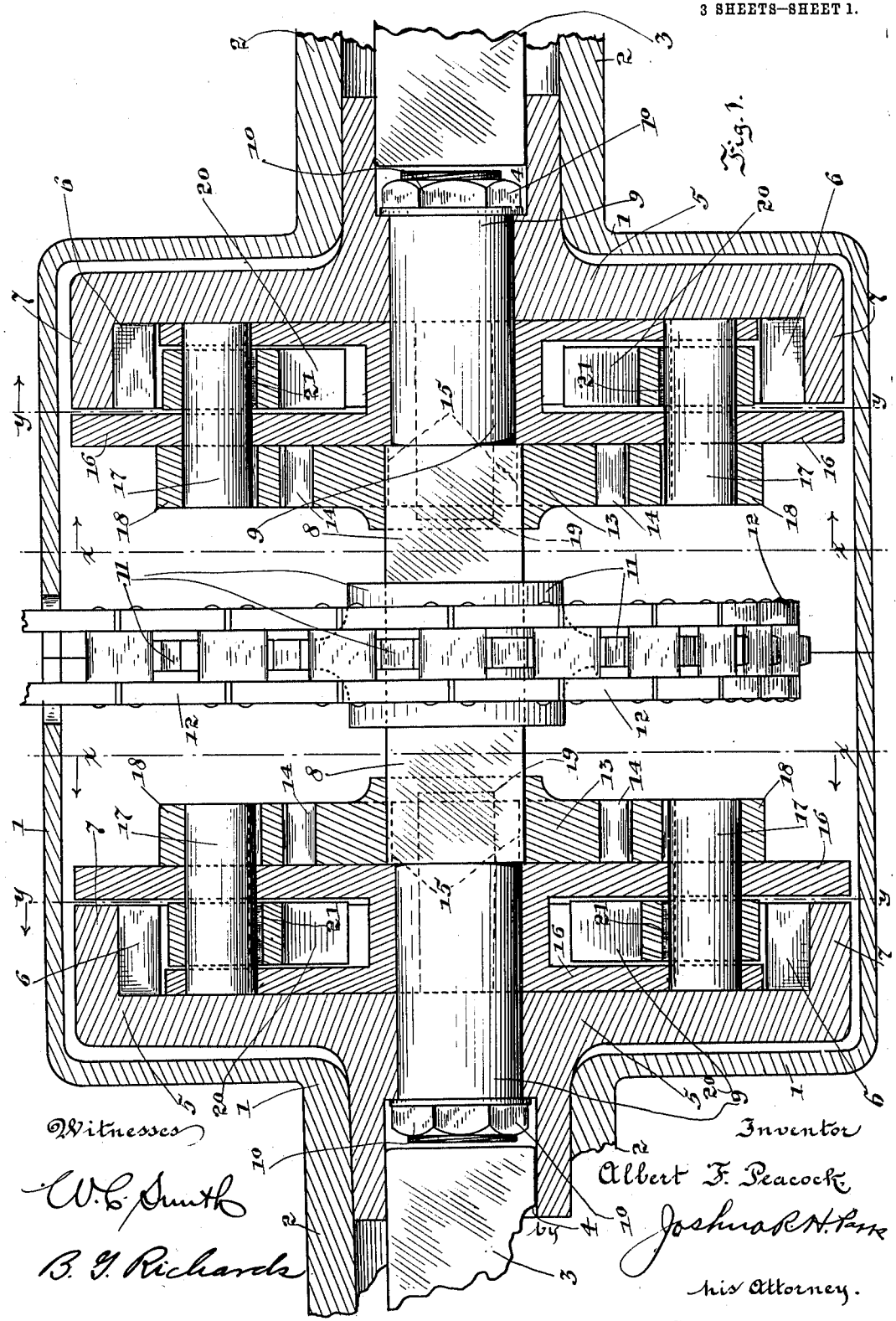

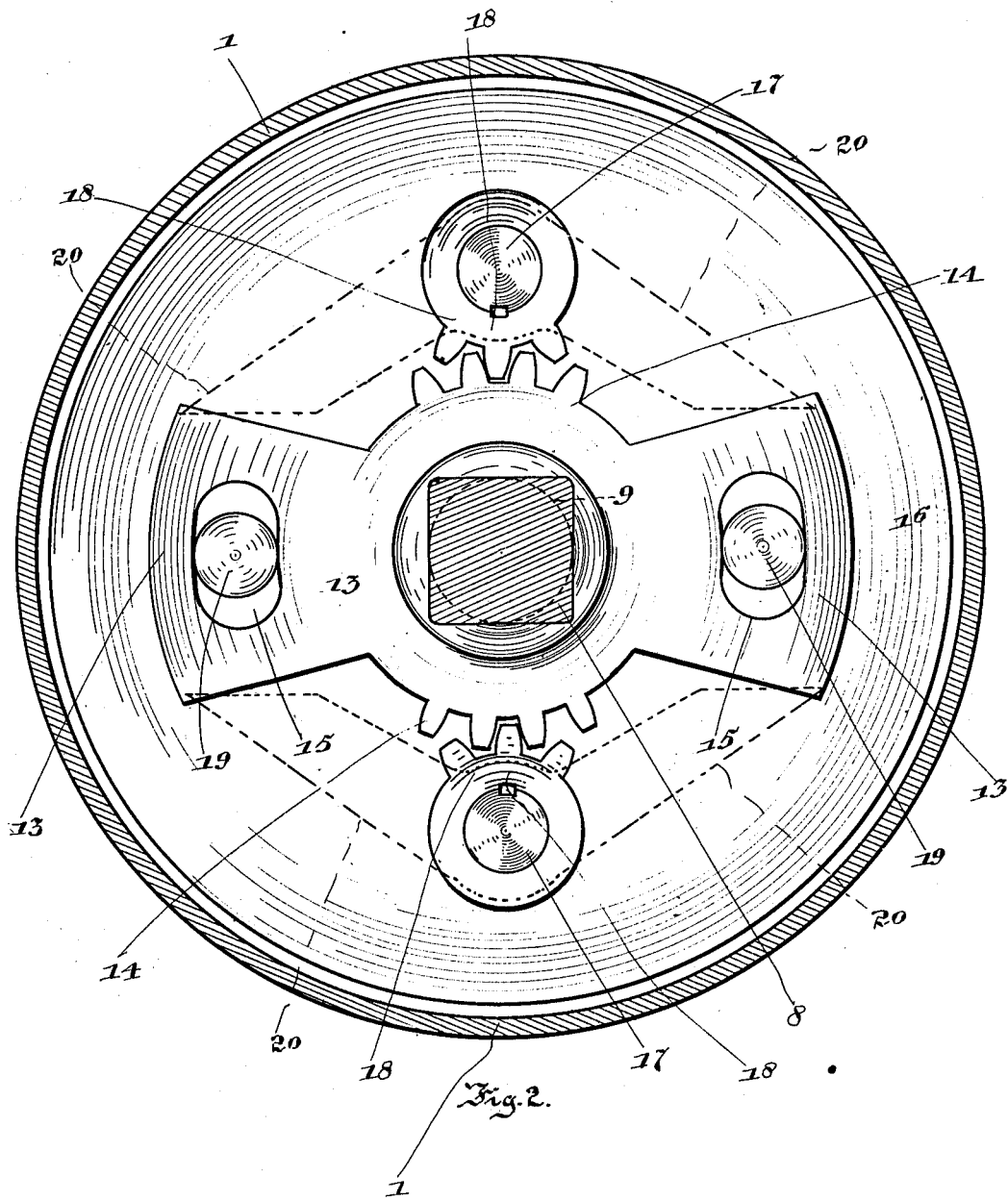

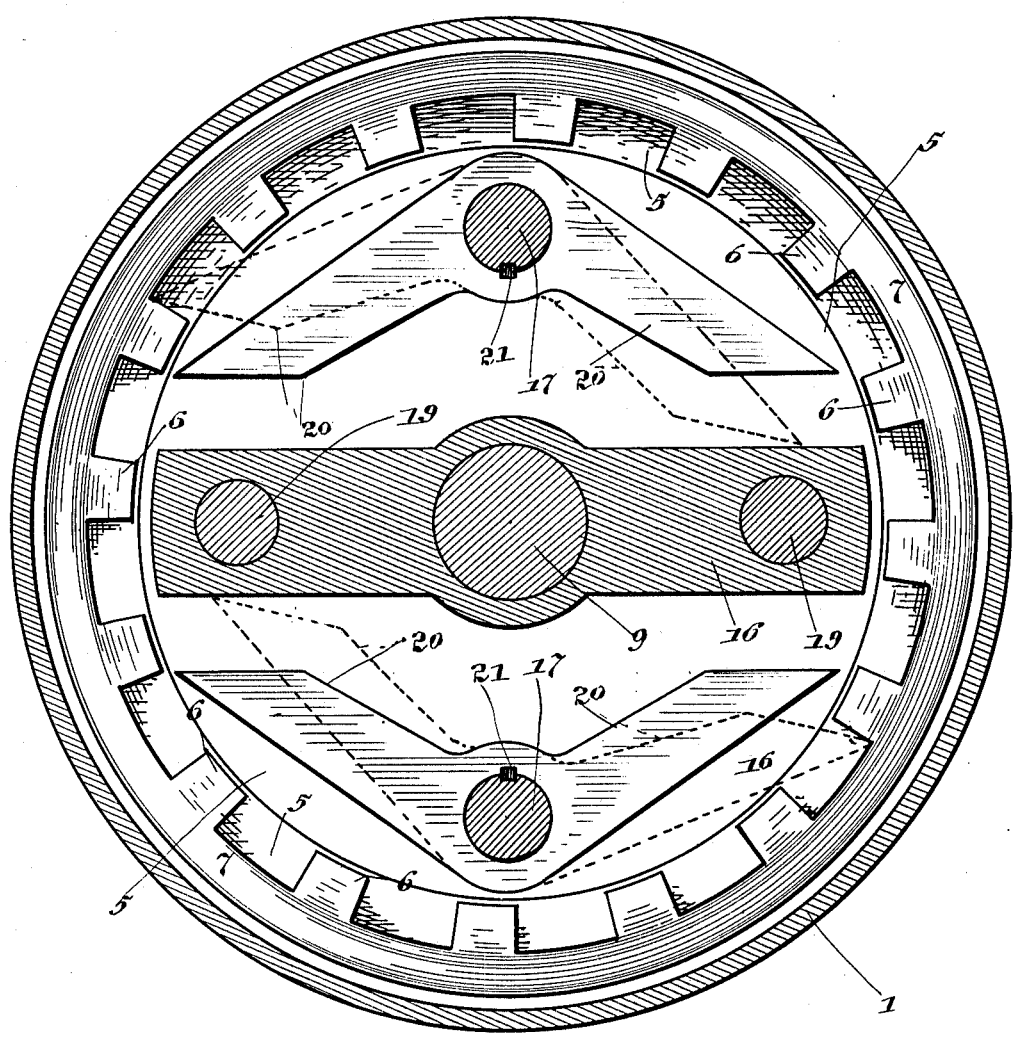
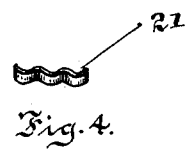

ALBERT F. PEACOCK, OF BUCHANAN, MICHIGAN, ASSIGNOR OF ONE-HALF TO ALFRED E. MEAD, OF CHICAGO, ILLINOIS.

DIFFERENTIAL GEARING.

978,057. Specification of Letters Patent. Patented Dec. 6, 1910.

Application filed July 20, 1910. Serial No. 572,878.

*To all whom it may concern:*

Be it known that I, ALBERT F. PEACOCK, a citizen of the United States, residing at Buchanan, county of Berrien, and State of Michigan, have invented certain new and useful Improvements in Differential Gearing, of which the following is a specification.

My invention relates to improvements in differential compensating gearing, and more particularly to gearing for connecting a power transmission mechanism with two separate alined shafts, as, for example, the transmission mechanism of an automobile with the two alined shafts of the rear axle thereof.

The primary object of my invention is to provide a gearing of the character stated which will be capable of positively driving an automobile providing either one or both of the propelling wheels thereof have traction with the road surface.

A further object of my invention is to provide an automobile differential gearing which will be simple of construction, economical to manufacture, and efficient in operation.

Other objects will appear hereinafter.

With these objects in view my invention consists in the novel construction and arrangement of parts which will be hereinafter fully described and more particularly pointed out in the appended claims.

My invention will be more readily understood by reference to the accompanying drawings forming a part of this specification, and in which, Figure 1 is a central horizontal section of my improved differential gearing in its preferred form, Fig. 2 is a transverse section taken on line x—x of Fig. 1, Fig. 3 is a transverse section taken on lines y—y of Fig. 1, and Fig. 4 is a detail perspective view.

The preferred form of my invention as illustrated in the accompanying drawings comprises a cylindrical two-part casing 1 which is provided at either extremity with rear axle sleeves 2 inclosing the live alined axles 3. The inner ends of the axles 3 are squared and fitted into sockets 4 provided therefor in the driving members 5, each of the latter being provided with teeth 6 which project inwardly from a laterally extending peripheral flange 7. A driving shaft 8 is provided with journals 9 at each end thereof which are journaled in the members 5 and retained therein by means of nuts 10. The central portion of the shaft 8 is squared, and mounted rigidly thereon is a chain sprocket 11 driven by a chain 12 which connects with the automobile transmission mechanism, not shown. Rigidly mounted on the shaft 8 at each end of the squared portion thereof is a member 13 provided with two co-axial oppositely disposed segment gears 14 and two diametrically opposite arcuate slots 15. Rotatably mounted on journals 9 intermediate the members 5 and 13 are double flanged members 16 in which diametrically opposite oscillatory stub shafts 17 arranged parallel with said journals are journaled, said shafts projecting from the members 16 and carrying segment pinions 18 which are rigidly keyed thereto. Diametrically opposite studs 19 arranged parallel with and spaced at 90 degrees from the stub shafts 17 are pressed firmly into the members 16 and project into the arcuate slots 15 for a purpose to be hereinafter explained.

The segment pinions 18 mesh with the segment gears 14 shown in Figs. 1 and 2 and are positively driven thereby. Oscillatorily mounted on stub shafts 17 intermediate the flanges of the members 16 are dogs 20, the same being held against free rotation on said shafts by means of resilient sinuously formed keys 21 shown in detail in Fig. 4. These keys hold the dogs 20 normally in position on the shafts 17 as do ordinary keys, but allow a slight oscillation thereof when subjected to pressure, in which case the keys will straighten out by pressure against the walls of the key-ways in which they are positioned. All of the dogs 20 are in engagement with the teeth 6 as indicated by dotted lines in Fig. 3 when the automobile is traveling in a straight direction, and the power would be transmitted equally to the segment pinions 18 were it not for the studs 19 and slots 15, these elements being provided to relieve the segment gears of the driving strain after the dogs have been oscillated into engagement with the teeth 6, said studs being adapted to contact with the ends of the slots to receive the driving strain simultaneously with the full engagement of said dogs.

The operation of the differential gearing when the automobile is rounding a corner is as follows: Suppose that the propelling wheel to which the live axle 3 shown at the left in Fig. 1 is traveling the faster, then the dogs at the left in said figure will cease to drive and the dogs at the right will continue to drive as before. When the dogs at the left cease to drive the teeth 6 due to the faster rotation of the latter, said dogs slide over said teeth one by one and are oscillated in so doing, hence the resilient keys 21 are necessary to permit one set of dogs to oscillate without disturbing the engagement of the other set of dogs, it being clear that the stub shafts 17 have a constant relation to each other. It is apparent from the construction as hereinbefore described that should one of the propelling wheels cease to have traction on the road surface and to propel the car, that the other wheel having good traction will continue to propel the car and prevent the same from being stalled.

While I have shown what I deem to be the preferable form of my improved automobile differential gearing, I do not wish to be limited thereto as there might be various changes made in the details of construction and arrangement of parts described without departing from the spirit of the invention comprehended within the scope of the appended claims.

Having described my invention what I claim as new and desire to secure by Letters Patent is:

1. A differential gearing comprising two alined driven shafts, a power shaft arranged between and in alinement with said driven shafts, means for driving said power shaft, and automatic means for connecting said driven shafts with said power shaft during the initial rotation of the latter, substantially as described.

2. In a differential gearing, two alined driven shafts, a power shaft in alinement with said shafts and arranged therebetween, means for driving said power shaft, members rigidly fixed to said driven shafts each having a laterally projecting toothed flange, there being journals formed on said power shaft and journaled in said members, a double flanged member mounted on each journal of said power shaft, oscillatory dogs mounted in each flange member and adapted to engage the teeth of said toothed members, and means for oscillating said dogs for engagement with said teeth during the initial movement of said power shaft, substantially as described.

3. In a differential gearing, the combination with two driven shafts in alinement with each other, of a power shaft arranged between and in alinement with said driven shafts, means for driving said power shaft at the center thereof, toothed flanged members rigidly connected to said driven shafts and rotatably mounted on said power shaft, double flanged members rotatably mounted on the journals of said power shaft, oscillatory dogs mounted between the flanges of said double flanged members and adapted to engage the teeth of said toothed flanged members, shafts journaled in said double flanged members on which said dogs are mounted, segment pinions keyed to said last named shafts, and segment gears meshing with said segment pinions rigidly fixed to said power shaft, substantially as described.

4. In an automobile differential gearing, a two-part casing and axle sleeves carried thereby, alined live axles inclosed by said sleeves and having squared inner ends, members fitted to said squared axle ends and having inwardly projecting teeth in the peripheral portions thereof, members having double radial flanges arranged adjacent said first named members, a power shaft having journals at each end thereof which are journaled in all of said members, shafts arranged parallel with said power shaft journals and journaled in the flanges of said double flanged members, oscillatory dogs mounted on said shafts and adapted to engage the teeth of said first named members, segment pinions keyed to said shafts, segment gears meshing with said pinions fixed to said power shaft, and means for driving the latter, substantially as described.

5. An automobile differential gearing comprising a cylindrical two-part casing, axle sleeves formed integral with and arranged co-axial with said casing, live axles mounted in said axle sleeves having squared inner ends, a power shaft having a central squared portion and cylindrical end portions, said live axles and said power shaft being in alinement, members having internal teeth rigidly fixed to the squared ends of said live axles and rotatably mounted on the cylindrical portions of said power shaft, double flanged members rotatably mounted on the cylindrical portions of said power shaft, stub shafts arranged parallel with said cylindrical portions and journaled in said double flanged members, oscillatory dogs mounted on said stub shafts and adapted to engage the teeth of said first mentioned members, segment pinions keyed to said stub shafts, double segment gears meshing with said pinions fixed to the squared portion of said power shaft, and a sprocket and chain for driving the latter, substantially as described.

6. In an automobile differential gearing, a cylindrical two-part casing, tubular axle sleeves integral with and co-axial with said casing, live axles mounted in said axle sleeves having squared inner ends, a power shaft having a central squared portion and cylindrical end portions, said live axles and said power shaft being in alinement, members having internal teeth rigidly fixed to the squared ends of said live axles and rotatably mounted on the cylindrical portions of said power shaft, double flanged members rotatably mounted on the cylindrical portions of said power shaft, stub shafts arranged parallel with said cylindrical portions and journaled in said double flanged members, oscillatory dogs mounted on said stub shafts and adapted to engage the teeth of said first named members, resilient keys interposed between said dogs and the shafts on which they are mounted, segment pinions keyed to said stub shafts, double segment gears meshing with said pinions fixed to the squared portion of said power shaft, and a sprocket centrally secured to the latter, substantially as described.

7. An automobile differential gearing comprising a cylindrical two-part casing, axle sleeves formed integral with and arranged co-axial with said casing, live axles mounted in said axle sleeves having squared inner ends, a power shaft having a central squared portion and cylindrical end portions, said live axles and said power shaft being in alinement, members having internal radial teeth rigidly fixed to the squared ends of said live axles and rotatably mounted on the cylindrical portions of said power shaft, double flanged members rotatably mounted on the cylindrical portions of said power shaft, stub shafts arranged parallel with said cylindrical portions and journaled in said double flanged members, double oscillatory dogs mounted on said stub shafts and adapted to engage the teeth of said first named members, resilient sinuously formed keys interposed between said dogs and the shafts on which they are mounted, segment pinions keyed to said stub shafts, double segment gears meshing with said pinions fixed to the squared portion of said power shaft and a sprocket and chain provided for the latter, substantially as described.

8. In a differential gearing, a cylindrical casing, axle sleeves formed integral with and arranged co-axial with said casing, live axles mounted in said axle sleeves having squared ends, a power shaft having a central squared portion and cylindrical end portions, said live axles and said power shaft being in alinement, members having internal teeth rigidly and rotatably mounted on the cylindrical portions of said power shaft, double flanged members rotatably mounted on the cylindrical portions of said power shaft, stub shafts arranged parallel with said cylindrical portions and journaled in said double flanged members, oscillatory dogs mounted on said stub shafts and adapted to engage the teeth of said first named members, resilient sinuously formed keys interposed between said dogs and the shafts on which they are mounted, segment pinions keyed to said stub shafts, double segment gears meshing with said pinions fixed to the squared portion of said power shaft, means for driving the latter, said double segment gears having arcuate slots, and studs secured in said double flanged members projecting into said slots, substantially as described.

In testimony whereof I have signed my name to this specification in the presence of two subscribing witnesses.

ALBERT F. PEACOCK.

Witnesses:
EDGAR HAM,
J. O. GARLAND.